(12) United States Patent
Ramakrishnan et al.

(10) Patent No.: US 8,540,490 B2
(45) Date of Patent: Sep. 24, 2013

(54) NOISE REDUCTION IN A TURBOMACHINE, AND A RELATED METHOD THEREOF

(75) Inventors: Kishore Ramakrishnan, Clifton Park, NY (US); Trevor Howard Wood, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/247,096

(22) Filed: Sep. 28, 2011

(65) Prior Publication Data

US 2012/0328432 A1 Dec. 27, 2012

Related U.S. Application Data

(63) Continuation-in-part of application No. 12/142,940, filed on Jun. 20, 2008, now abandoned.

(51) Int. Cl.
*F01D 5/14* (2006.01)

(52) U.S. Cl.
USPC .............................................. 416/203; 416/1

(58) Field of Classification Search
None
See application file for complete search history.

(56) References Cited

U.S. PATENT DOCUMENTS

| | | | | |
|---|---|---|---|---|
| 3,397,535 A | * | 8/1968 | Dechaux | 60/39.5 |
| 3,572,960 A | * | 3/1971 | McBride | 415/115 |
| 3,953,148 A | * | 4/1976 | Seippel et al. | 415/199.5 |
| 4,720,239 A | * | 1/1988 | Owczarek | 415/181 |
| 4,968,216 A | * | 11/1990 | Anderson et al. | 415/199.5 |
| 5,486,091 A | * | 1/1996 | Sharma | 415/194 |
| 6,139,259 A | * | 10/2000 | Ho et al. | 415/119 |
| 6,174,129 B1 | * | 1/2001 | Mazzola et al. | 415/127 |
| 6,350,103 B1 | * | 2/2002 | Hashimoto et al. | 415/199.5 |
| 6,402,458 B1 | * | 6/2002 | Turner | 415/1 |
| 6,409,469 B1 | * | 6/2002 | Tse | 415/119 |
| 6,527,503 B2 | * | 3/2003 | Spano et al. | 415/1 |
| 6,540,478 B2 | * | 4/2003 | Fiala et al. | 415/194 |
| 6,554,562 B2 | * | 4/2003 | Dudebout et al. | 415/1 |
| 6,733,240 B2 | * | 5/2004 | Gliebe | 416/228 |
| 7,094,027 B2 | * | 8/2006 | Turner et al. | 415/194 |
| 7,234,914 B2 | * | 6/2007 | Usab et al. | 415/1 |
| 7,444,802 B2 | * | 11/2008 | Parry | 60/226.1 |
| 7,632,068 B2 | | 12/2009 | Bak et al. | |
| 7,685,713 B2 | | 3/2010 | McKeever | |
| 7,758,297 B2 | * | 7/2010 | Fiala | 415/1 |
| 8,087,253 B2 | * | 1/2012 | Ning et al. | 60/806 |
| 2007/0154314 A1 | * | 7/2007 | Jarrah et al. | 416/203 |
| 2009/0317237 A1 | | 12/2009 | Wood et al. | |
| 2010/0054929 A1 | * | 3/2010 | Ning et al. | 415/189 |

FOREIGN PATENT DOCUMENTS

GB 1071095 A 6/1967

OTHER PUBLICATIONS

Hsu et al., "Reduction of Unsteady Blade Loading by Beneficial Use of Vortical and Potential Disturbances in an Axial Compressor with Rotor Clocking", Journal of Turbomachinery, vol. 120, Oct. 1998, pp. 705-713.

\* cited by examiner

*Primary Examiner* — Scott B Geyer
(74) *Attorney, Agent, or Firm* — Joseph J. Christian

(57) ABSTRACT

An apparatus includes a first set of blades and a second set of blades disposed downstream relative to the first set of blades. The first set of blades includes a first subset of blades, wherein each blade among the first subset of blades comprises one or more first geometric parameters. The second set of blades includes a second subset of blades, wherein each blade among the second subset of blades comprises one or more second geometric parameters different from the one or more first geometric parameters.

23 Claims, 4 Drawing Sheets

NOISE REDUCTION IN A TURBOMACHINE, AND A RELATED METHOD THEREOF

CROSS REFERENCE TO RELATED APPLICATIONS

This application is a continuation-in-part of U.S. patent application Ser. No. 12/142,940, entitled "SYSTEM AND METHOD FOR REDUCTION OF UNSTEADY PRESSURES IN TURBOMACHINERY", filed Jun. 20, 2008, which is herein incorporated by reference.

BACKGROUND

The invention relates generally to turbomachines and, more particularly, to arrangement of blades in turbomachines so as to reduce noise during operation.

Gas turbine engine manufacturers are faced with the problem of developing new ways of effectively reducing noise. One of the common noise sources includes noise generated by the turbomachinery within the gas turbine engine. The turbomachinery noise results from a relative motion of adjacent sets of blades, typical of those found in compressors (including fans) and turbines. For example, a compressor comprises multiple bladed stages, each stage including a rotatable blade row and possibly a stationary blade row. It has long been recognized that in turbomachines one of the principal noise sources is the interaction between the wakes of upstream blades and downstream blades during operation. This wake interaction results in noise at the upstream blade passing frequency and at its harmonics, as well as broadband noise covering a wide spectrum of frequencies.

One of the commonly used methods to reduce the wake interaction noise is to increase the axial spacing between adjacent sets of blades. This modification provides space for the wake to dissipate before reaching the downstream set of blades, resulting in less noise. However, increased spacing of blades in turbomachines increases axial length of the machine leading to more weight, aerodynamic performance losses, and/or installation and space requirements.

Therefore, an improved means of reducing the wake interaction noise is desirable.

BRIEF DESCRIPTION

In accordance with one exemplary embodiment of the present invention, an apparatus includes a first set of blades and a second set of blades disposed downstream relative to the first set of blades. The first set of blades includes a first subset of blades, wherein each blade among the first subset of blades comprises one or more first geometric parameters. The first set of blades includes a second subset of blades, wherein each blade among the second subset of blades comprises one or more second geometric parameters different from the one or more first geometric parameters.

In accordance with another exemplary embodiment of the present invention, a method includes rotating a first set of blades relative to a second set of blades disposed downstream relative to the first set of blades. The first set of blades includes a first subset of blades and a second subset of blades. Each blade among the first subset of blades includes one or more first geometric parameters. Each blade among the second subset of blades includes one or more second geometric parameters different from the one or more first geometric parameters. The method further includes impacting a first wake generated by the first subset of blades with the second set of blades. The method also includes impacting a second wake generated by the second subset of blades with the second set of blades such that the spectral content of wake excitation perceived, and an acoustic signal generated by the second set of blades is altered.

In accordance with another exemplary embodiment of the present invention, a method includes rotating one set of blades relative to another set of blades disposed upstream relative to the one set of blades. The other set of blades includes a first subset of blades and a second subset of blades. Each blade among the first subset of blades includes one or more first geometric parameters. Each blade among the second subset of blades includes one or more second geometric parameters different from the one or more first geometric parameters. The method further includes impacting a first wake generated by the first subset of blades with the one set of blades. The method also includes impacting a second wake generated by the second subset of blades with the one set of blades such that spectral content of wake excitation perceived, and an acoustic signal generated by the one set of blades is altered.

DRAWINGS

These and other features, aspects, and advantages of the present invention will become better understood when the following detailed description is read with reference to the accompanying drawings in which like characters represent like parts throughout the drawings, wherein.

Figure 3:
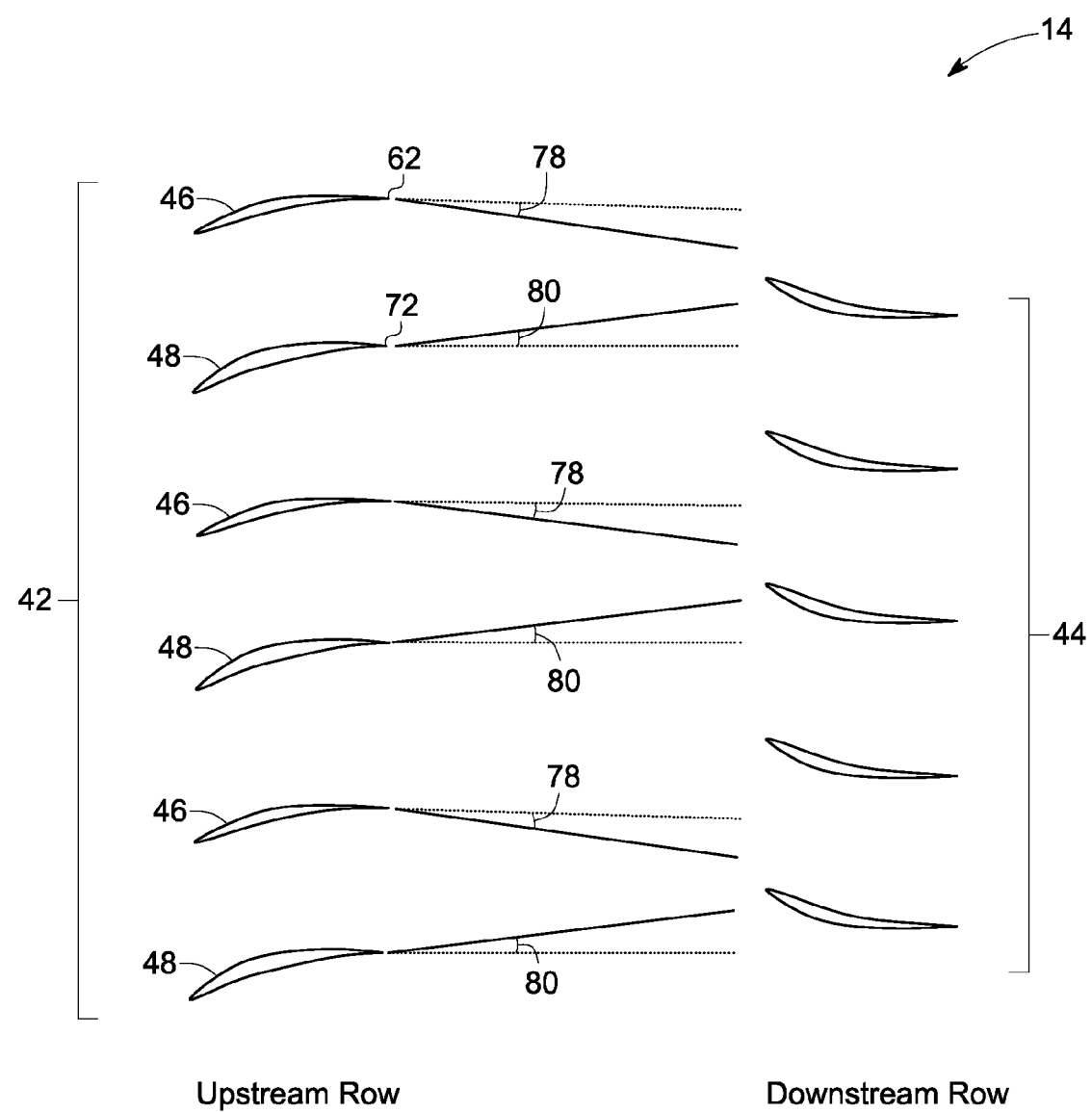
Figure 4:
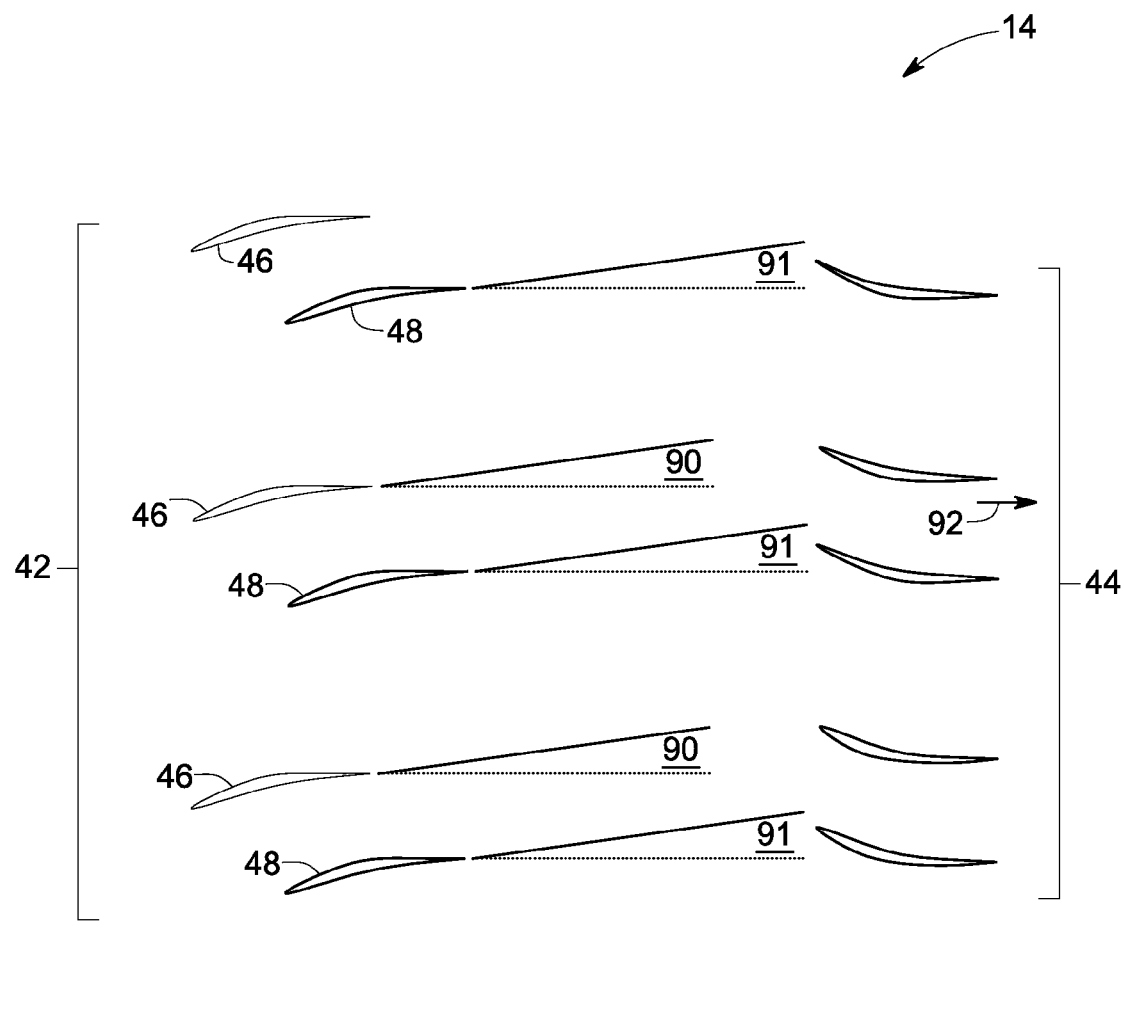

FIG. 3 is a schematic top view of a two-dimensional cross-section of a first set of blades and a second set of blades in a turbomachine, in accordance with an exemplary embodiment of the present invention; and FIG. 4 is a schematic top view of a two-dimensional cross-section of a first set of blades and a second set of blades in a turbomachine, in accordance with an exemplary embodiment of the present invention.

DETAILED DESCRIPTION

As discussed in detail below, embodiments of the invention include a system and method for reduction of wake interaction noise in apparatus such as turbomachines or the like. As used herein, the system and method are applicable to various types of applications having blade-wake interactions resulting in unsteady pressure. Further, the term 'unsteady pressure' as used herein refers to air unsteady pressures and acoustics as well as blade surface unsteady pressure that are also referred to as 'aeromechanical loading'. Non-limiting examples of such turbomachine applications include compressors, turbojets, turbofans, turboshafts, turbo propulsion engines, aircraft engines, gas turbines, steam turbines, wind turbines, or water/hydro turbines. The embodiments of the present invention are beneficial by allowing the designer the freedom to both redistribute and reduce acoustic energy emitted by the system.

Figure 1:
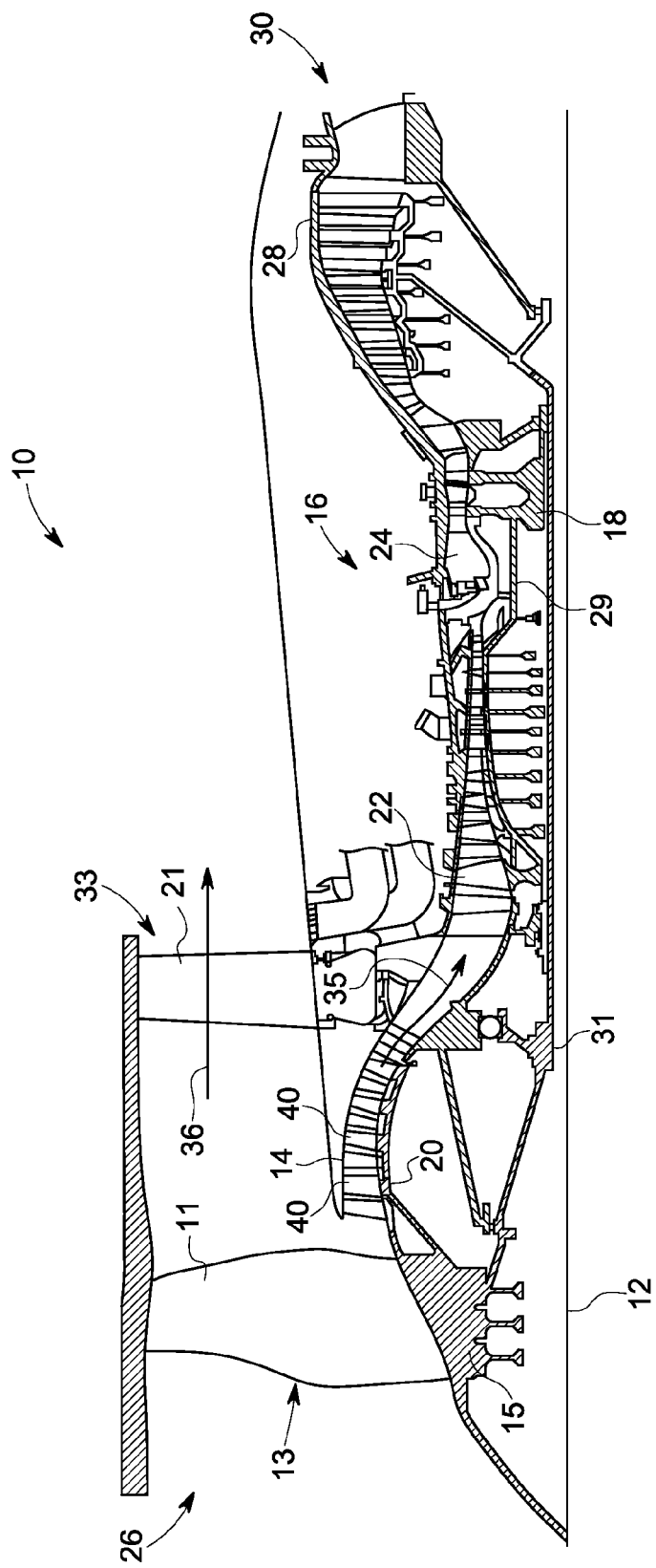
FIG. 1 is diagrammatical illustration of a turbomachine, for example a gas turbine engine having an exemplary blade arrangement in accordance with an exemplary embodiment of the present invention.

FIG. 1 is a partial schematic illustration of an exemplary gas turbine engine assembly 10 having a centerline axis 12. In the exemplary embodiment, engine assembly 10 includes a fan assembly 13, a booster compressor 14, a gas turbine engine 16, and a low-pressure turbine 28 that is coupled to the fan assembly 13 and the booster compressor 14. The fan assembly 13 includes a plurality of rotor fan blades 11 that extend substantially radially outward from a fan rotor disk 15, as well as a plurality of stator vanes 21 that are positioned downstream of the fan blades 11. The gas turbine engine 16 includes a high-pressure compressor 22, a combustor 24, and a high-pressure turbine 18. The booster compressor 14 includes a plurality of rotor blades 40 that extend substantially radially outward from a compressor rotor disk 20 coupled to a first drive shaft 31. The compressor 22 is coupled to the high-pressure turbine 18 via a second drive shaft 29. The engine assembly 10 also includes an intake side 26, an engine exhaust side 30, and a fan exhaust side 33.

During operation, air entering the engine 10 through the intake side 26 is compressed by the fan assembly 13. The airflow exiting fan assembly 13 is split such that a portion 35 of the airflow is channeled into the booster compressor 14 and a remaining portion 36 of the airflow bypasses the booster compressor 14 and the turbine engine 16, and exits the engine 10 through the fan exhaust side 33. The bypass airflow portion 36 flows past and interacts with the stators vanes 21 creating unsteady pressures on the stator vane surfaces, as well as in the surrounding airflow that radiate as acoustic waves. The plurality of rotor blades 40 compress and deliver the compressed airflow portion 35 towards the gas turbine engine 16. The airflow portion 35 is further compressed by the high-pressure compressor 22 and is delivered to the combustor 24. The airflow portion 35 from the combustor 24 drives the rotating turbines 18 and 28, and exits engine 10 through the engine exhaust side 30.

In one embodiment, the compressor or turbine stages may be disposed along an axial direction. In another embodiment, the compressor or turbine stages are disposed along a radial direction. In yet another embodiment, the compressor or turbine stages may be disposed along both radial and axial directions. It should be noted herein that although a gas turbine engine assembly is disclosed herein, the exemplary system and method are applicable to various types of applications having blade-wake interactions resulting in unsteady pressure.

Figure 2:
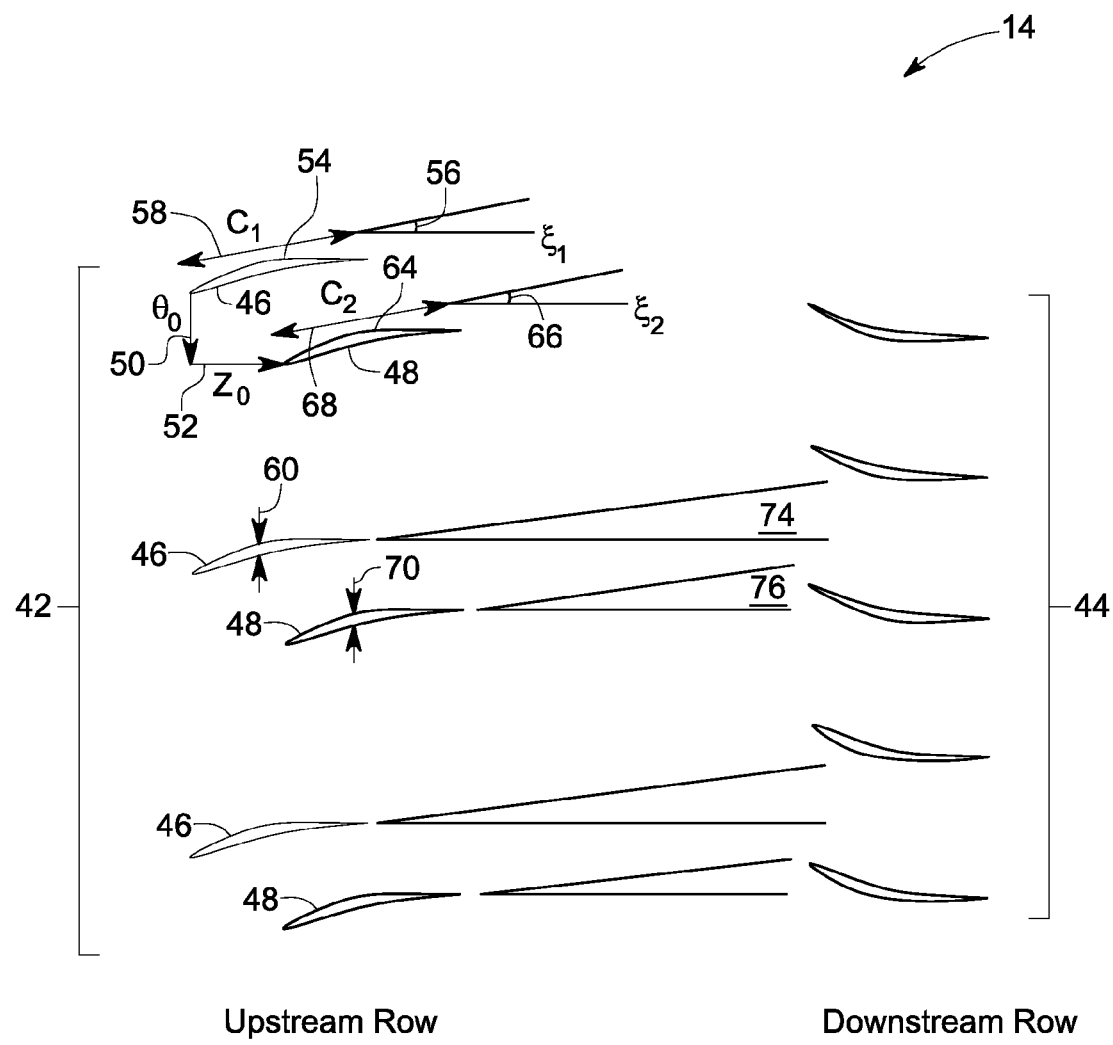
FIG. 2 is a schematic top view of a two-dimensional cross-section of a first set of blades and a second set of blades in a turbomachine, in accordance with an exemplary embodiment of the present invention.

FIG. 2 is a schematic illustration of an exemplary first set of blades 42 and a second set of blades 44 located in the fan 11, for example in the turbomachine system 10 of FIG. 1. As illustrated, the second set of blades 44 are disposed downstream of the first set of blades 42. In other embodiments, the first set of blades 42, and the second set of blades 44 may be located in the booster 14, the compressor 22, or the turbine 18, 28.

In one embodiment, the first set of blades 42 includes rotatable blades and the second set of blades 44 includes stationary blades. In another embodiment, the first set of blades 42 includes stationary blades and the second set of blades 44 includes rotatable blades. In yet another embodiment, both the first set of blades 42 and the second set of blades 44 include rotatable and contra-rotating blades. In the illustrated embodiment, the first set of blades 42 includes a first subset of blades 46 and a second subset of blades 48. It should be noted that in other embodiments, the first set of blades 42 may include more than two subset of blades. The second subset of blades 48 are disposed offset along a circumferential direction 50 and an axial direction 52 relative to the first subset of blades 46.

In the illustrated embodiment, each blade among the first subset of blades 46 includes a plurality of first geometric parameters. The plurality of first geometric parameters includes a camber 54, a stagger 56, a chord 58, a blade thickness 60, and a trailing edge camber angle 62 (shown in FIG. 3) of each blade among the first subset of blades 46. Each blade among the second subset of blades 48 includes a plurality of corresponding second geometric parameters different from the first geometric parameters. The plurality of second geometric parameters includes a camber 64, a stagger 66, a chord 68, a blade thickness 70, and a trailing edge camber angle 72 (shown in FIG. 3) of each blade among the first subset of blades 46. It should be noted herein that the first and second geometric parameters may additionally include sweep and dihedral of the first subset of blades 46 and the second subset of blades 48.

The first and second geometric parameters may be varied depending on the application. In one embodiment, the chord 68 of the second subset of blades 48 may be varied relative to the chord 58 of the first subset of blades 46. In another embodiment, an "inclination angle" relative to axial direction referred to as the stagger 66 of the second subset of blades 48 may be varied relative to the stagger 56 of the first subset of blades 46. In yet another embodiment, "curvature of the blade" referred to as the camber 64 of the second subset of blades 48 may be varied relative to the camber 54 of the first subset of blades 46. In yet another exemplary embodiment, the blade thickness 70 of the second subset of blades 48 may be varied relative to the blade thickness 60 of the first subset of blades 46. In yet another exemplary embodiment, the trailing edge camber angle 72 (shown in FIG. 3) of the second subset of blades 48 may be varied relative to the trailing edge camber angle 62 of the first subset of blades 46.

As has been previously discussed, one of the principal sources of unsteady pressure in the turbomachine is the interaction between wakes of the first set of blades 42 and the second set of blades 44, moving relative to each other. As is well understood, the wake is defined as the region of reduced momentum behind an airfoil evidenced by the aerodynamic drag of the blade.

In the illustrated embodiment of FIG. 2, if the first set of blades 42 is rotated relative to the second set of blades 44, the first subset of blades 46 shed a first wake 74 that is impacted by the second set of blades 44. Additionally, the second subset of blades 48 shed a second wake 76 that is impacted by the second set of blades 44. However, if the second subset of blades 48 are disposed offset along the circumferential direction 50 and the axial direction 52 relative to the first subset of blades 46, the wake interaction with the second set of blades 44 will occur at different and non-uniformly distributed instants of time. In other words, the first subset of blades 46 and the second subset of blades 48 are spaced optimally such that the spectral content of the wake excitation perceived by the second set of blades 44, and acoustic waves resulting from such an interaction are altered to produce less overall noise, as described below. It should be noted herein that in the illustrated embodiment spectral content of the wake excitation perceived by the second set of blades 44, and acoustic waves resulting from such an interaction are altered compared to a scenario in which spectral content of the wake excitation perceived by the second set of blades 44, and acoustic waves resulting from such an interaction when the entire first set of blades 42 have the same geometric parameters. In another embodiment, the first subset of blades 46 and the second subset of blades 48 may be optimally spaced to reduce unsteady surface pressure loads on the second set of blades 44. Additionally, variation in corresponding geometric parameters of the first subset of blades 46 and the second subset of blades 48 also alters spectral content of wake excitation perceived by the second set of blades 44 to produce less overall noise. It should also be noted herein that an acoustic signal from the second set of blades 44 is the resultant of all the wakes from the first set of blades 42. In some embodiments, the second set of blades 44 is counter rotated relative to the first set of blades 42.

FIG. 3 is a schematic illustration of the exemplary first set of blades 42 and the second set of blades 44 in the turbomachine system 10. The second set of blades 44 are disposed downstream of the first set of blades 42. In the illustrated exemplary embodiment, the trailing edge camber angle 72 of the second subset of blades 48 may be varied relative to the trailing edge camber angle 62 of the first subset of blades 46.

It should be noted herein that variation in the trailing edge camber angle of the first and second subset of blades 46, 48 contributes to slightly different airflow exit angles 78, 80 such that the wake arrival time at the downstream blade row leading edges are non-uniformly distributed and the acoustic waves resulting from the interaction radiate less coherently to produce less overall noise.

FIG. 4 is a schematic illustration of the exemplary first set of blades 42 and the second set of blades 44 similar to the embodiment of FIG. 2. As illustrated, the second set of blades 44 are disposed downstream of the first set of blades 42. In the illustrated embodiment, the first set of blades 42 includes stationary blades and the second set of blades 44 includes rotatable blades.

If the second set of blades 44 is rotated relative to the first set of blades 42, the first subset of blades 46 shed a first wake 90 that is impacted by the second set of blades 44. Additionally, the second subset of blades 48 shed a second wake 91 that is impacted by the second set of blades 44. However, if the second subset of blades 48 are disposed offset along the circumferential direction 50 and the axial direction 52 relative to the first subset of blades 46, the wake interaction with the second set of blades 44 will occur at different and non-uniformly distributed instants of time. In other words, the first subset of blades 46 and the second subset of blades 48 are spaced optimally such that the spectral content of the wake excitation perceived by the second set of blades 44, and an acoustic signal 92 resulting from such an interaction are altered to produce less overall noise. Additionally, variation in corresponding geometric parameters of the first subset of blades 46 and the second subset of blades 48 also alters spectral content of wake excitation perceived by the second set of blades 44 to produce less overall noise.

The various embodiments discussed herein for reduction of unsteady pressure in turbomachinery thus provide a convenient and efficient means to reduce aerodynamic noise and/or aeromechanical loading caused by interaction of wakes between sets of blades moving relative to each other. The technique provides non-uniform spacing between blades in the upstream set of blades resulting in a reduction in unsteady blade loading that also results in reduced noise signals and/or a noise field that superimposes in a way to reduce peak noise signals. In other words, noise reduction can be accomplished by altering the spacing of the wakes generated from the upstream blade row in a non-uniform way so as to redistribute the spectral content of the wake excitation perceived by the downstream blade row. This has the effect of reducing/redistributing the spectral content of the unsteady loading on the downstream airfoils, thereby reducing the airfoil structural response and/or the noise generated. The variation in geometric parameters also contributes to the overall noise reduction.

Furthermore, the skilled artisan will recognize the interchangeability of various features from different embodiments. For example, the first set of blades may include a third subset of blades described with respect to one embodiment may include a geometric variation of at least one of a camber, a stagger, a chord, a blade thickness, and a trailing edge camber angle relative to a first subset and a second subset of blades described with respect to another. Similarly, the various features described, as well as other known equivalents for each feature, can be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An apparatus, comprising:
a first set of blades comprising:
a first subset of blades, wherein each blade among the first subset of blades comprises one or more first geometric parameters; and
a second subset of blades, wherein each blade among the second subset of blades comprises one or more second geometric parameters different from the one or more first geometric parameters; wherein the first subset of blades and the second subset of blades are arranged so that a first wake generated by the first subset of blades is distinct from a second wake generated by the second subset of blades; and
a second set of blades disposed downstream relative to the first set of blades; wherein at least one set of blades among the first set of blades and the second set blades are movable relative to each other.

2. The apparatus of claim 1, wherein the second subset of blades are disposed offset along a circumferential direction and an axial direction relative to the first subset of blades.

3. The apparatus of claim 1, wherein the first set of blades comprises a plurality of rotatable blades and the second set of blades comprises a plurality of stationary blades.

4. The apparatus of claim 1, wherein the first set of blades comprises a plurality of stationary blades and the second set of blades comprises a plurality of rotatable blades.

5. The apparatus of claim 1, wherein the first set of blades are counter rotatable relative to the second set of blades.

6. The apparatus of claim 1, wherein the one or more first geometric parameters comprise at least one of a camber, a stagger, a chord, a blade thickness, a trailing edge camber angle, blade sweep, and a blade dihedral.

7. The apparatus of claim 1, wherein the one or more second geometric parameters comprises at least one of a camber, a stagger, a chord, a blade thickness, a trailing edge camber angle, blade sweep, and a blade dihedral.

8. The apparatus of claim 1, wherein the apparatus comprises a turbomachine.

9. An apparatus, comprising:
a first set of rotatable blades comprising:
a first subset of blades, wherein each blade among the first subset of blades comprises one or more first geometric parameters; and
a second subset of blades, wherein each blade among the second subset of blades comprises one or more second geometric parameters different from the one or more first geometric parameters; wherein the first subset of blades and the second subset of blades are arranged so that a first wake generated by the first subset of blades is distinct from a second wake generated by the second subset of blades; and a second set of stationary blades disposed downstream relative to the first set of blades.

10. An apparatus, comprising:
a first set of stationary blades comprising:
  a first subset of blades, wherein each blade among the first subset of blades comprises one or more first geometric parameters; and
  a second subset of blades, wherein each blade among the second subset of blades comprises one or more second geometric parameters different from the one or more first geometric parameters; and
a second set of rotatable blades disposed downstream relative to the first set of blades.

11. An apparatus, comprising:
a first set of blades comprising:
  a first subset of blades, wherein each blade among the first subset of blades comprises one or more first geometric parameters; and
  a second subset of blades, wherein each blade among the second subset of blades comprises one or more second geometric parameters different from the one or more first geometric parameters; and
a second set of stationary blades disposed downstream relative to the first set of blades; wherein the first set of blades are counter rotatable relative to the second set of blades.

12. An apparatus, comprising:
a first set of blades comprising:
  a first subset of blades, wherein each blade among the first subset of blades comprises one or more first geometric parameters; and
  a second subset of blades, wherein each blade among the second subset of blades comprises one or more second geometric parameters different from the one or more first geometric parameters; and
a second set of blades disposed downstream relative to the first set of blades; wherein at least one set of blades among the first set of blades and the second set blades are movable relative to each other, wherein the first set of blades comprises a plurality of stationary blades and the second set of blades comprises a plurality of rotatable blades.

13. An apparatus, comprising:
a first set of blades comprising:
  a first subset of blades, wherein each blade among the first subset of blades comprises one or more first geometric parameters; and
  a second subset of blades, wherein each blade among the second subset of blades comprises one or more second geometric parameters different from the one or more first geometric parameters; and
a second set of blades disposed downstream relative to the first set of blades; wherein at least one set of blades among the first set of blades and the second set blades are movable relative to each other, wherein the first set of blades are counter rotatable relative to the second set of blades.

14. A method, comprising:
rotating a first set of blades relative to a second set of blades disposed downstream relative to the first set of blades, wherein the first set of blades comprises a first subset of blades and a second subset of blades; wherein each blade among the first subset of blades comprises one or more first geometric parameters; wherein each blade among the second subset of blades comprises one or more second geometric parameters different from the one or more first geometric parameters;
impacting a first wake generated by the first subset of blades with the second set of blades; and
impacting a second wake generated by the second subset of blades with the second set of blades such that spectral content of wake excitation perceived, and an acoustic signal generated by the second set of blades is altered, wherein the first wake is distinct from the second wake.

15. The method of claim 14, wherein the one or more first geometric parameters comprise at least one of a camber, a stagger, a chord, a blade thickness, a trailing edge camber angle, blade sweep, and a blade dihedral.

16. The method of claim 14, wherein the one or more second geometric parameters comprises at least one of a camber, a stagger, a chord, a blade thickness, and a trailing edge camber angle, blade sweep, and a blade dihedral.

17. The method of claim 14, further comprising counter rotating the second set of blades relative to the first set of blades.

18. A method, comprising:
rotating one set of blades relative to another set of blades disposed upstream relative to the one set of blades, wherein the other set of blades comprises a first subset of blades and a second subset of blades; wherein each blade among the first subset of blades comprises one or more first geometric parameters; wherein each blade among the second subset of blades comprises one or more second geometric parameters different from the one or more first geometric parameters;
impacting a first wake generated by the first subset of blades with the one set of blades; and
impacting a second wake generated by the second subset of blades with the one set of blades such that spectral content of wake excitation perceived, and an acoustic signal generated by the one set of blades is altered, wherein the first wake is distinct from the second wake.

19. The method of claim 18, wherein the one or more first geometric parameters comprises at least one of a camber, a stagger, a chord, a blade thickness, a trailing edge camber angle, blade sweep, and a blade dihedral of each blade among the first subset of blades.

20. The method of claim 18, wherein the one or more second geometric parameters comprises at least one of a camber, a stagger, a chord, a blade thickness, a trailing edge camber angle, blade sweep, and a blade dihedral of each blade among the second subset of blades.

21. A method, comprising:
moving at least one set of blades among a first set of blades and a second set of blades relative to each other; wherein the second set of blades are disposed downstream relative to the first set of blades, wherein the first set of blades comprises a first subset of blades and a second subset of blades; wherein each blade among the first subset of blades comprises one or more first geometric parameters; wherein each blade among the second subset of blades comprises one or more second geometric parameters different from the one or more first geometric parameters;
impacting a first wake generated by the first subset of blades with the second set of blades; and
impacting a second wake generated by the second subset of blades with the second set of blades such that spectral content of wake excitation perceived, and an acoustic signal generated by the second set of blades is altered, wherein the first wake is distinct from the second wake.

22. A method, comprising:
rotating a first set of blades relative to a second set of blades disposed downstream relative to the first set of blades, wherein the first set of blades comprises a first subset of blades and a second subset of blades; wherein each blade among the first subset of blades comprises one or more first geometric parameters; wherein each blade among the second subset of blades comprises one or more second geometric parameters different from the one or more first geometric parameters;

counter rotating the second set of blades relative to the first set of blades;

impacting a first wake generated by the first subset of blades with the second set of blades; and impacting a second wake generated by the second subset of blades with the second set of blades such that spectral content of wake excitation perceived, and an acoustic signal generated by the second set of blades is altered.

23. A method, comprising:

rotating a first set of blades relative to a second set of blades disposed downstream relative to the first set of blades, wherein the first set of blades comprises a first subset of blades and a second subset of blades; wherein each blade among the first subset of blades comprises one or more first geometric parameters; wherein each blade among the second subset of blades comprises one or more second geometric parameters different from the one or more first geometric parameters;

impacting a first wake generated by the first subset of blades with the second set of blades;

impacting a second wake generated by the second subset of blades with the second set of blades such that spectral content of wake excitation perceived, and an acoustic signal generated by the second set of blades is altered; and counter rotating the second set of blades relative to the first set of blades.

\* \* \* \* \*

UNITED STATES PATENT AND TRADEMARK OFFICE
CERTIFICATE OF CORRECTION

PATENT NO. : 8,540,490 B2
APPLICATION NO. : 13/247096
DATED : September 24, 2013
INVENTOR(S) : Ramakrishnan et al.

It is certified that error appears in the above-identified patent and that said Letters Patent is hereby corrected as shown below:

In the Specification

In Column 2, Line 29, delete "is" and insert -- is a --, therefor.

In the Claims

In Column 6, Line 32, in Claim 1, delete "set blades" and insert -- set of blades --, therefor.

In Column 7, Line 38, in Claim 12, delete "set blades" and insert -- set of blades --, therefor.

In Column 7, Line 54, in Claim 13, delete "set blades" and insert -- set of blades --, therefor.

Signed and Sealed this
Fifteenth Day of July, 2014

Michelle K. Lee
*Deputy Director of the United States Patent and Trademark Office*